UNITED STATES PATENT OFFICE.

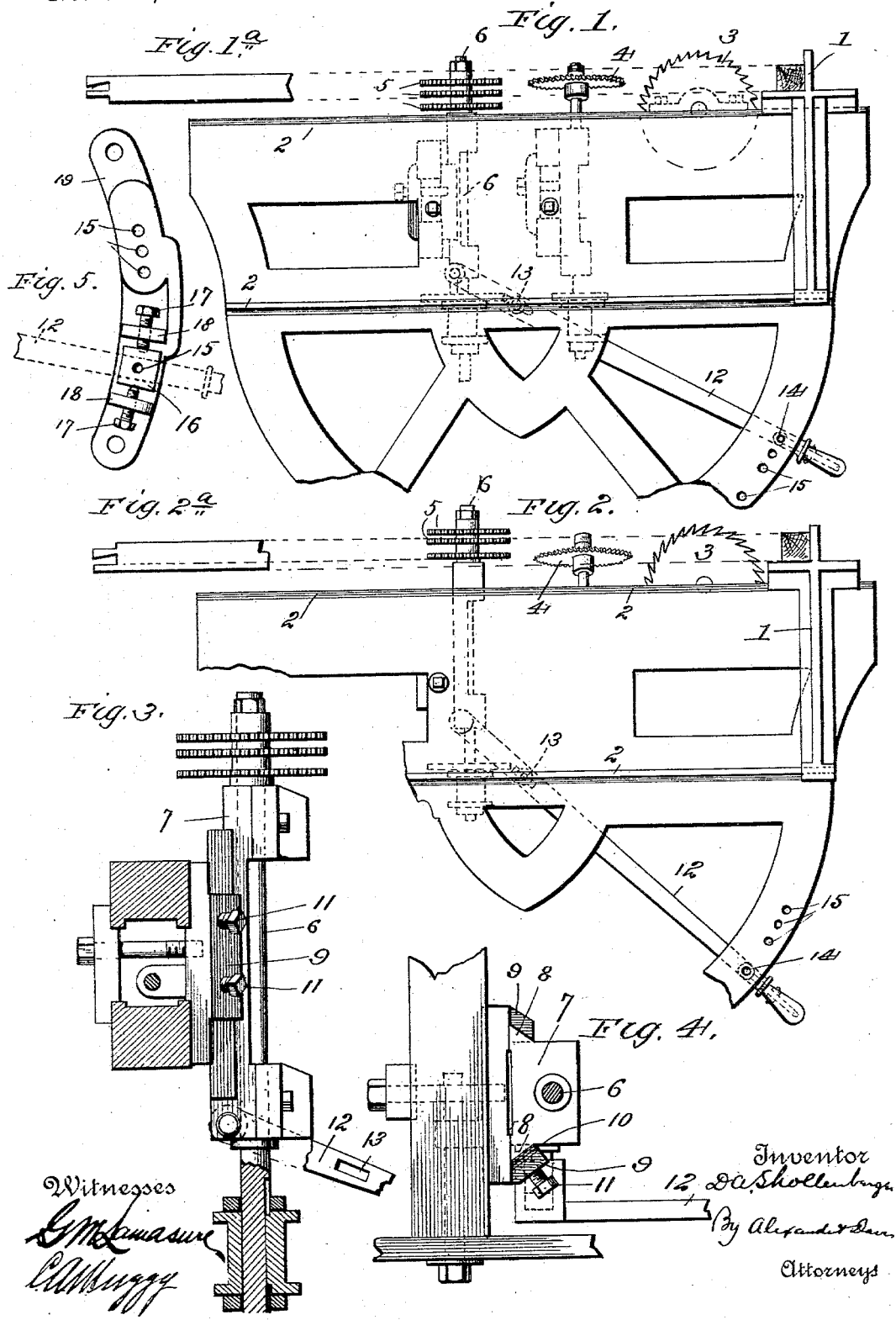

DANIEL A. SHOLLENBERGER, OF MONTGOMERY, PENNSYLVANIA.

SASH-STILE-DOVETAILING MACHINE.

SPECIFICATION forming part of Letters Patent No. 546,253, dated September 10, 1895.

Application filed July 3, 1895. Serial No. 554,860. (No model.)

*To all whom it may concern:*

Be it known that I, DANIEL A. SHOLLENBERGER, a citizen of the United States, residing at Montgomery, in the county of Lycoming and State of Pennsylvania, have invented certain new and useful Improvements in Machines for Dovetailing Sash-Stiles, of which the following is a specification, reference being had therein to the accompanying drawings.

This improvement has special relation to the means for forming the tenons on the upper and lower stiles of the sash; and it consists, essentially, in providing the main vertical mandrel with a series of three or more horizontal cutters, differently spaced, and making the mandrel vertically adjustable in order that said series of cutters may be readily adjusted with reference to the inclined cutter, whereby the same machine may be used for cutting the tenons on both the upper stiles and the lower stiles without removing or rearranging any of the cutters or other parts, as is more fully hereinafter set forth.

In the drawings, Figure 1 is a side elevation of a portion of the machine with the cutters set to form the tenons on the upper stiles. Fig. 1ª is a detail view of one end of the upper stile, showing the form of tenons and grooves cut thereon by the arrangement of cutters shown in Fig 1; Fig. 2, a side elevation of a portion of the machine, showing a series of cutters raised to the position they occupy while forming the tenons and grooves on the lower stiles; Fig. 2ª, a detail view of one end of a lower stile, showing the tenons and grooves cut by the arrangement of cutters shown in Fig. 2; Figs. 3 and 4, detail views of parts hereinafter described; and Fig. 5 a detail view of the lever adjustment hereinafter described.

In the drawings the numeral 1 designates the usual carriage, adapted to slide on the usual horizontal ways 2 formed on the outside of the frame; 3, the usual circular saw, adapted to cut the stiles to the proper length; 4, the usual horizontally-inclined cutter carried by the usual adjustable spindle at the rear of the saw 3 and adapted to form the inclined wall of the groove or dovetail in the stile, and 5 a series of three cutters secured on a vertical mandrel 6, said cutters being spaced different distances apart, the lower one being separated from the intermediate one by a larger space than that which separates the intermediate one from the upper one. The mandel 6 is journaled in a vertical stock 7, which is provided with dovetail flanges 8, which work in vertical ways 9, suitably bolted to the frame. To take up the wear of the impinging surfaces, a suitable packing 10 is interposed between one of the ways 9 and the adjacent flange 8, and this packing is held in place by the set-screws 11, tapped through said way. To vertically slide the stock, I pivot thereto at its lower end a lever 12, which is pivoted at 13 to the frame and which is provided near its outer end with a suitable pin or bolt 14 of the ordinary construction, said pin or bolt being adapted to engage any one of a series of holes 15 in the frame to lock the lever and the mandrel in their adjusted positions.

It will be observed that by simply shifting the mandrel 6 vertically its upper or lower cutter may be brought into alignment with the inclined cutter and the intermediate cutter shifted to form a groove either on the upper side of the stile or upon its lower side, whereby the machine is made adaptable to dovetailing either the upper stiles or the lower stiles, as may be desired, without removing or rearranging any of its parts and without stopping the operation of the machine, whereby a considerable saving in time is secured, especially where frequent shifting is required. As will be seen, when the cutters are adjusted as shown in Fig. 1 the lower cutter will be out of use, and when adjusted to the position shown in Fig. 2 the upper cutter will perform no work. As shown in Fig. 5, the lower one of the series of holes 15 is formed in a block 16, which is vertically adjustable between two set-screws 17, tapped in lugs 18, carried by the plate 19, secured to the frame. The object in thus making the lower hole adjustable is to enable me to make three different-sized dovetails, in proportion to the thickness of the stiles. As will be seen, I employ four openings 15, the lower adjustable one being separated from the three upper stationary ones by a space considerably greater than that which separates the upper ones from each other, which arrangement gives all the variety of adjustment necessary. For instance, if it is desired to cut a three-eighths dovetail in the lower stiles the lever is set in the adjustable hole, and for a three-eighths dovetail in the top stiles the lever is set at the lowest one of the stationary holes, the inclined cutter 4 being vertically set about midway between the vertical throw of the main cutters, as is evident.

Having thus fully described my invention, what I claim is—

1. In a machine for dovetailing stiles &c., the combination of a frame, a carriage, an inclined cutter head 4 vertically adjustable, a vertically adjustable mandrel carrying a series of three or more cutters differently spaced with reference to each other, a lever for vertically adjusting said mandrel, a stationary part carrying a series of holes adapted to be engaged by said lever, the lower hole being adjustable with reference to the other holes, substantially as described.

2. In a machine for dovetailing stiles &c., the combination of a frame, a carriage, an inclined cutter head, a vertically adjustable mandrel carrying a series of cutters differently spaced with reference to each other, and means for adjusting and locking the mandrel, substantially as described.

3. In a machine for dovetailing stiles &c., the combination of a frame, a carriage slidable thereon, a horizontally inclined cutter supported in the frame, a vertical mandrel supported in the frame to the rear of the inclined cutter, three cutters secured on the mandrel, the intermediate cutter being nearer to one of its adjacent cutters than the other, and means for vertically adjusting the mandrel to bring either the upper cutter or the lower cutter approximately in line with the horizontally-inclined cutter, substantially as described.

In testimony whereof I affix my signature in presence of two witnesses.

DANIEL A. SHOLLENBERGER.

Witnesses:
G. GUISE DYKINS,
R. J. CRAWFORD.